No. 834,397. PATENTED OCT. 30, 1906.
F. McCLINTOCK.
TYPE DISTRIBUTING MACHINE.
APPLICATION FILED OCT. 17, 1902.
6 SHEETS—SHEET 2.
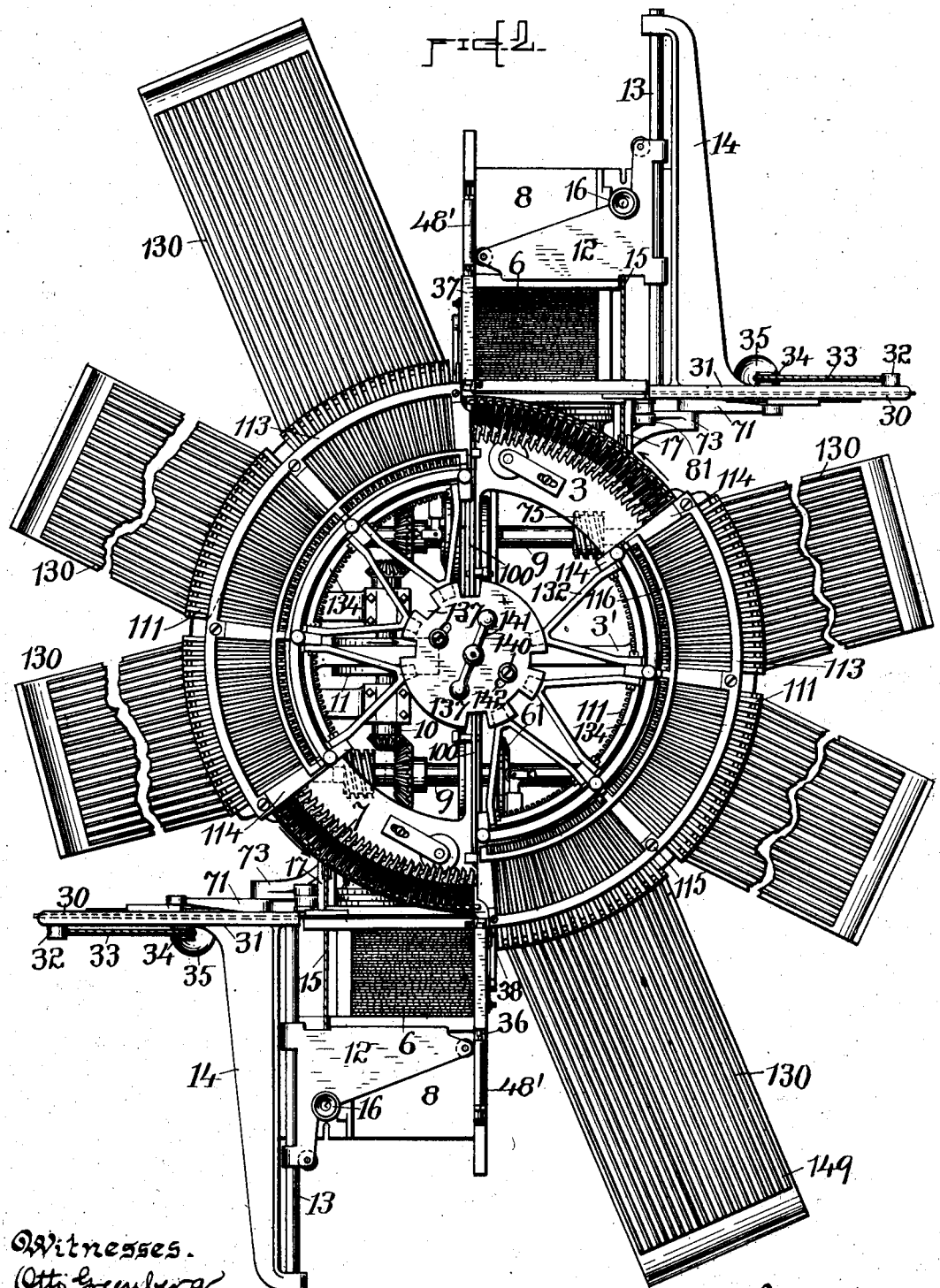
Witnesses.
Otto Greenberg
A. A. de Bonneville
Inventor
Frank McClintock

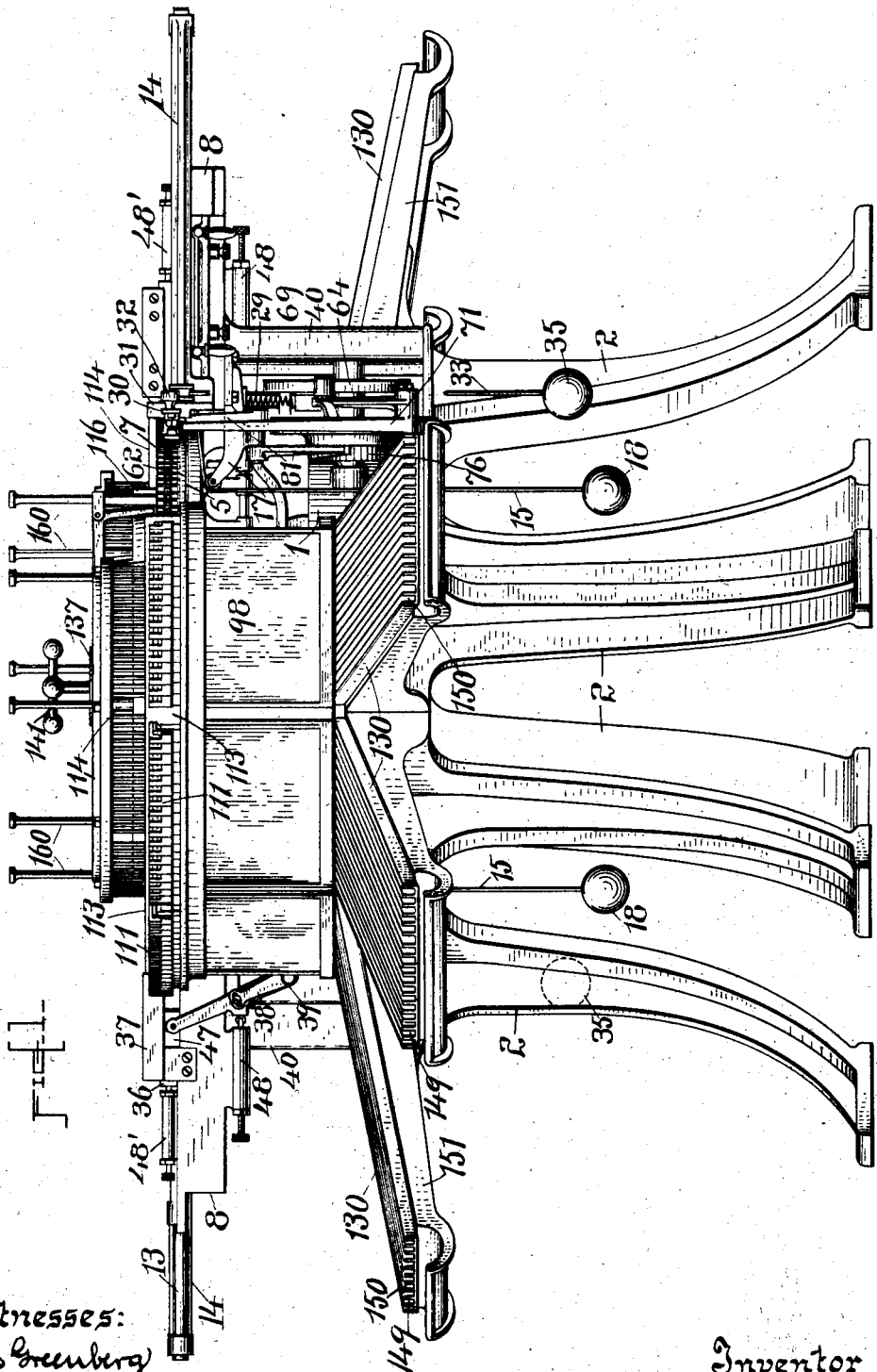

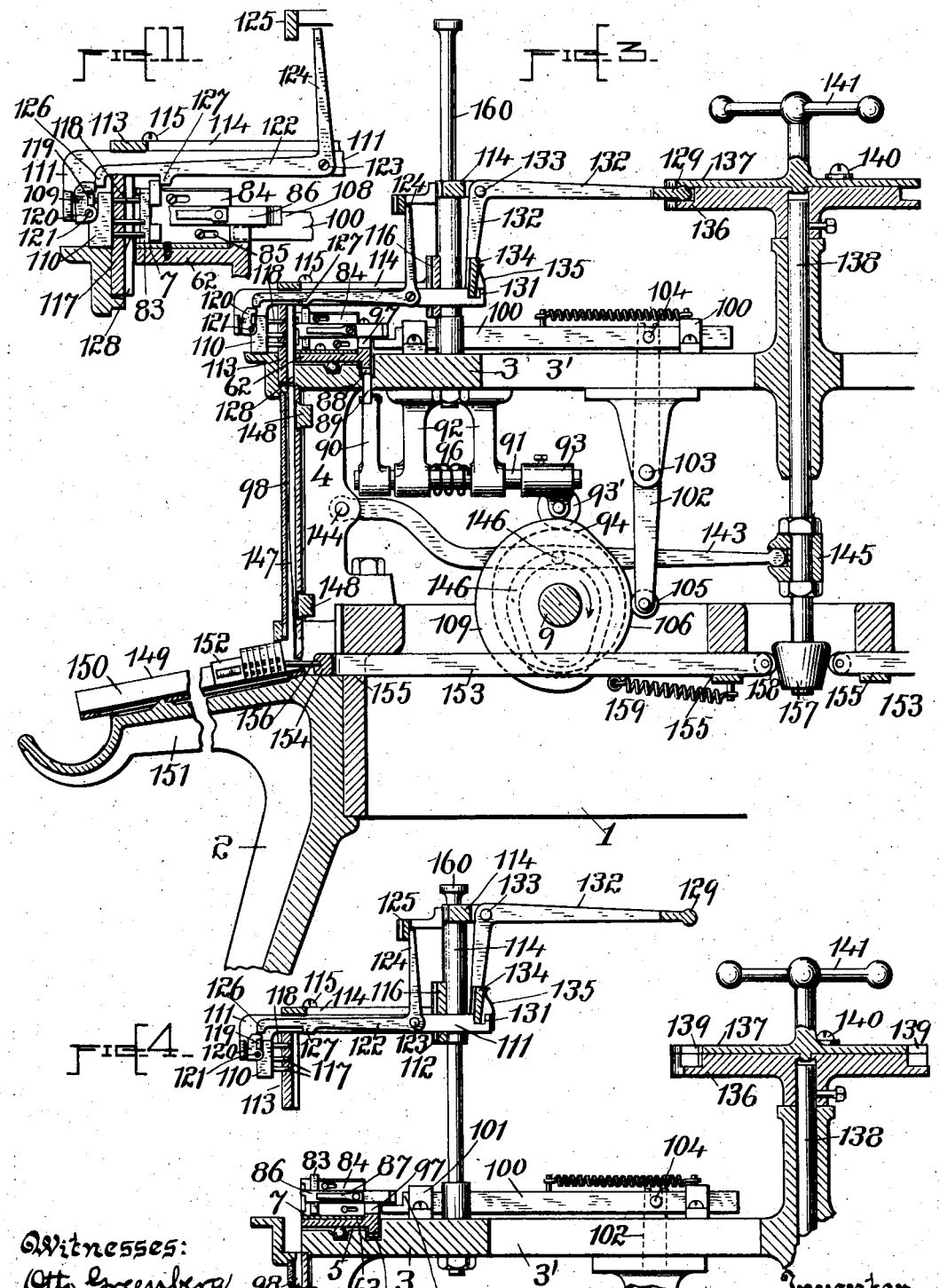

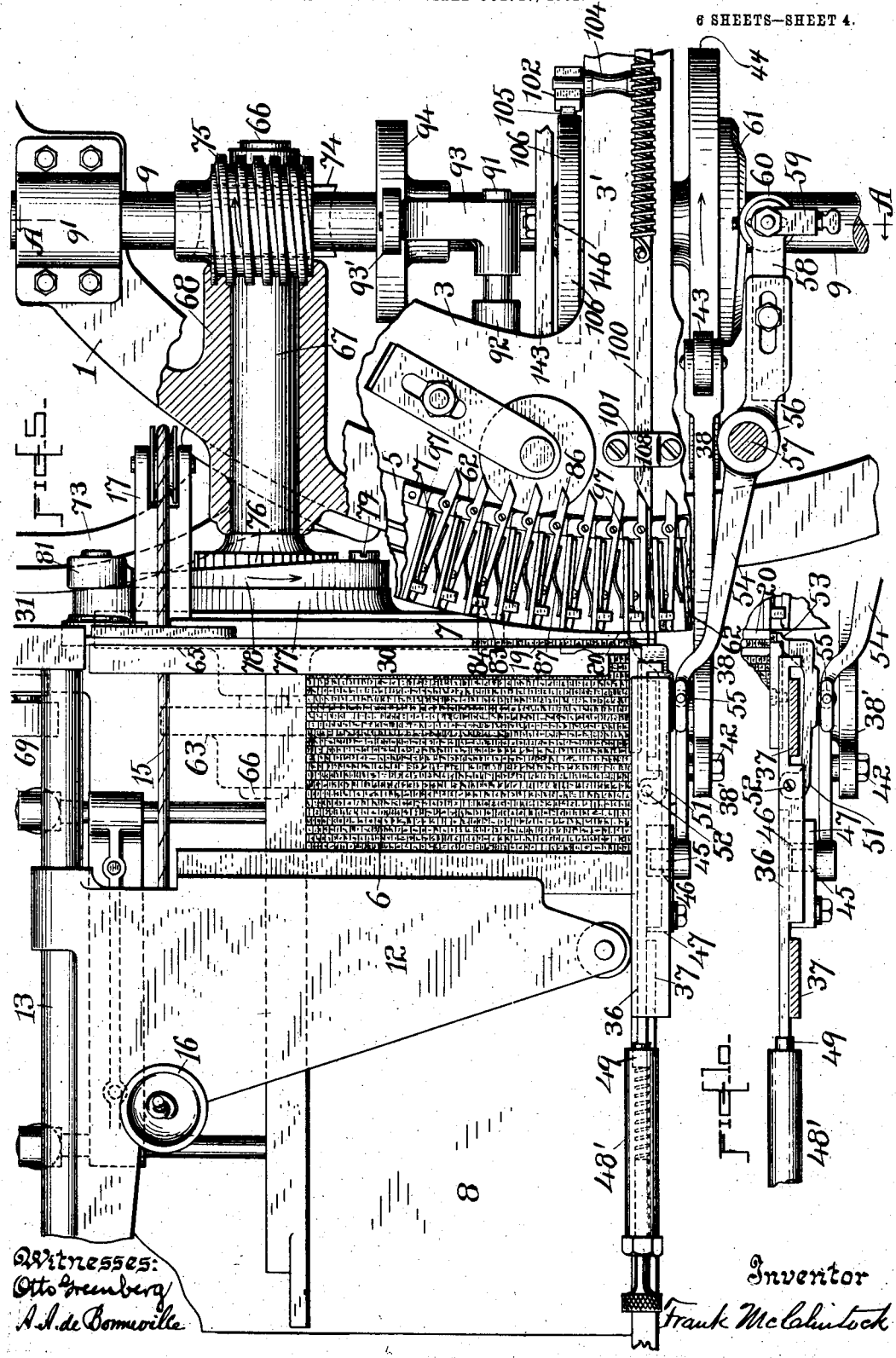

No. 834,397. PATENTED OCT. 30, 1906.
F. McCLINTOCK.
TYPE DISTRIBUTING MACHINE.
APPLICATION FILED OCT. 17, 1902.
6 SHEETS—SHEET 5.
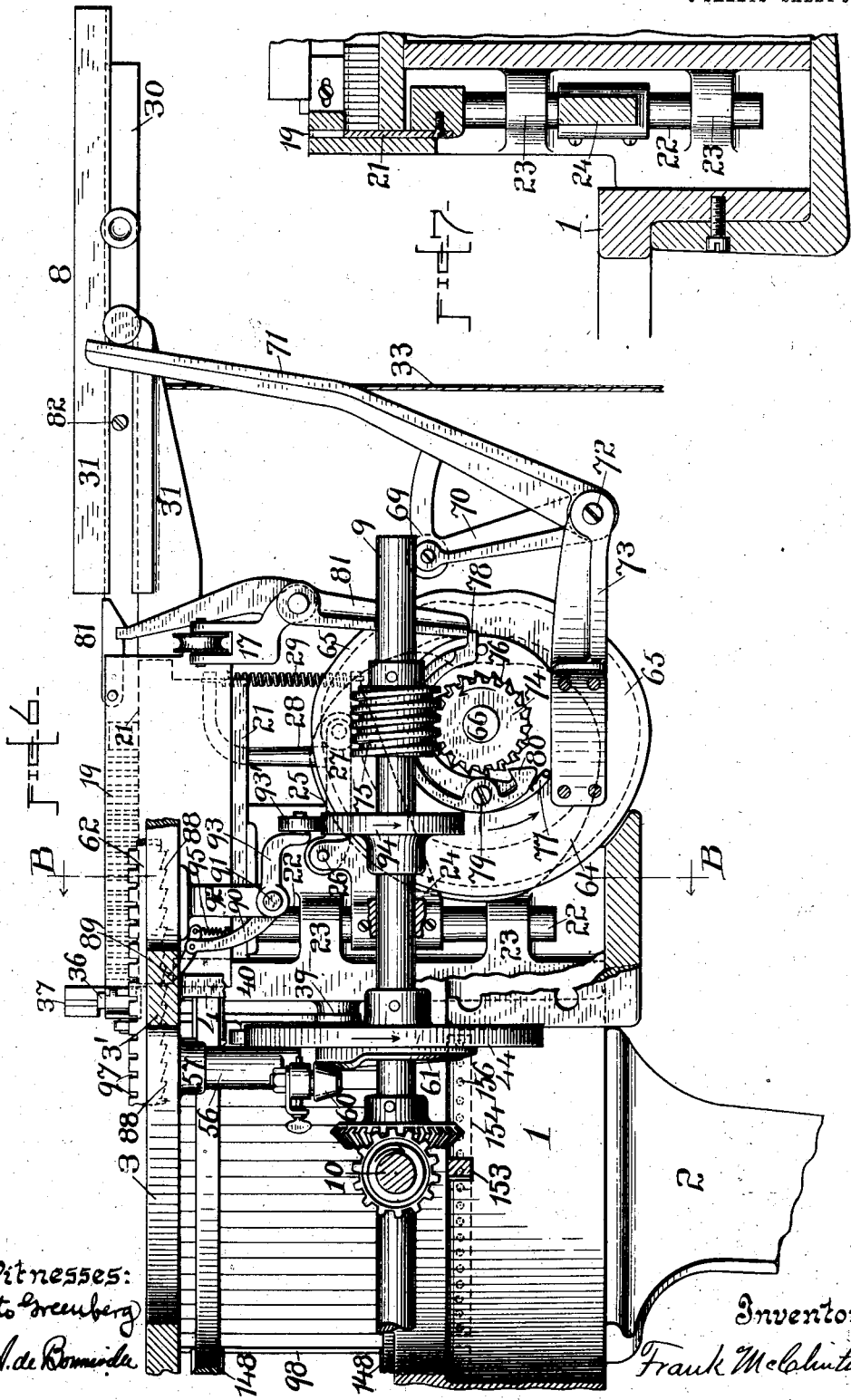
Witnesses:
Otto Greenberg
A. A. de Bonivda
Inventor
Frank McClintock No. 834,397. PATENTED OCT. 30, 1906.
F. McCLINTOCK.
TYPE DISTRIBUTING MACHINE.
APPLICATION FILED OCT. 17, 1902.
6 SHEETS—SHEET 6.
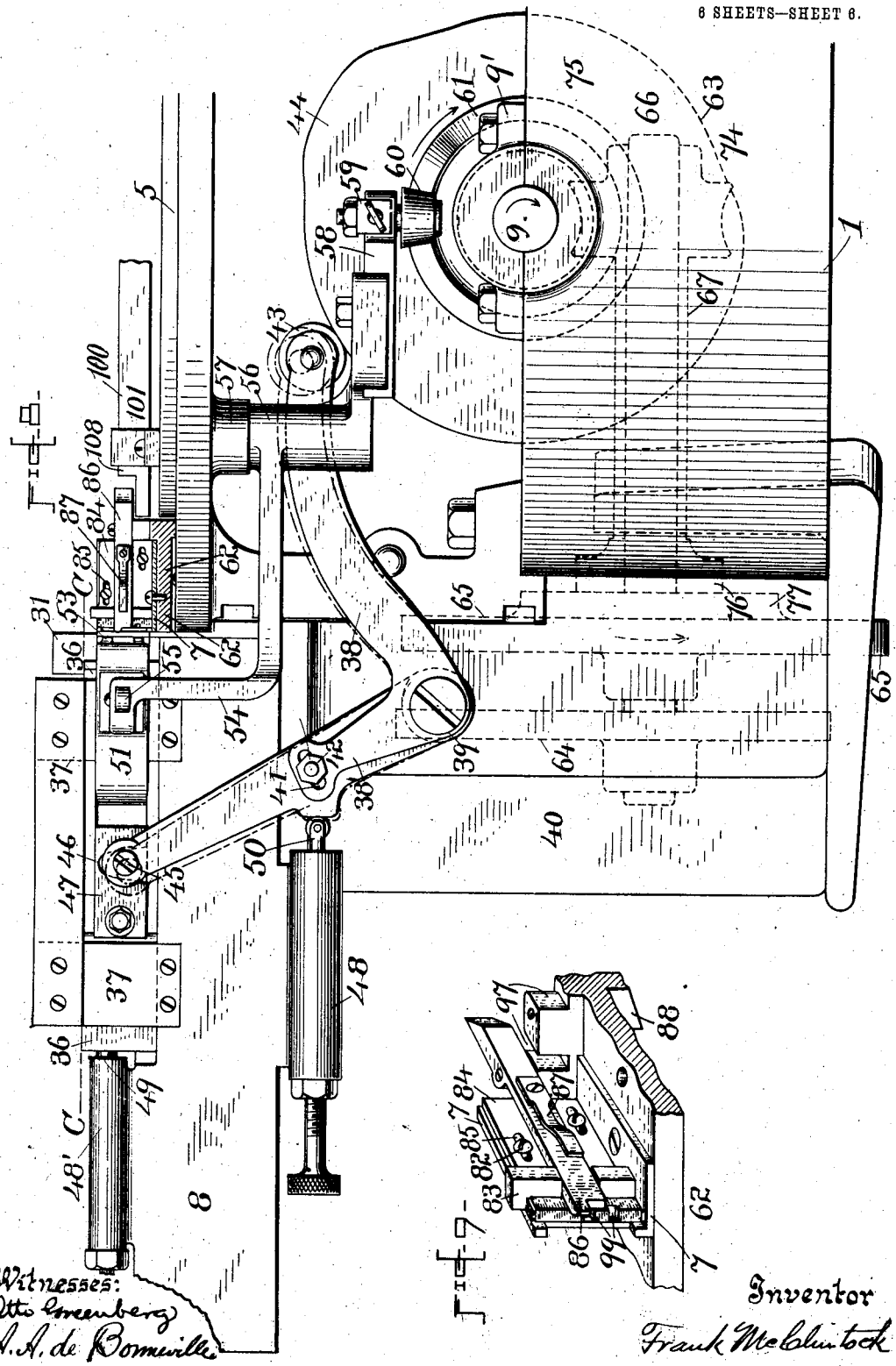
Witnesses:
Otto Greenberg
A. A. de Bonneville
Inventor
Frank McClintock

UNITED STATES PATENT OFFICE.

FRANK McCLINTOCK, OF MOUNT VERNON, NEW YORK, ASSIGNOR TO MERGENTHALER LINOTYPE COMPANY, OF NEW YORK, N. Y., A CORPORATION OF NEW YORK.

TYPE-DISTRIBUTING MACHINE.

No. 834,397.     Specification of Letters Patent.     Patented Oct. 30, 1906.

Application filed October 17, 1902. Serial No. 127,626.

*To all whom it may concern:*

Be it known that I, FRANK MCCLINTOCK, a citizen of the United States, and a resident of the city of Mount Vernon, in the county of Westchester and State of New York, have invented certain new and useful Improvements in Type-Distributing Machines, of which the following is a specification.

My invention relates to improvements in machines for automatically distributing type, and is particularly adapted to that class of type-distributing machines originally invented by C. W. Dickinson, as is shown and described in United States Patents numbered 174,899 and 174,900, issued March 21, 1876, and subsequently improved by W. A. Lorenz, as shown and described in United States Patent No. 174,915, issued March 21, 1876, and by L. K. Johnson, as shown and described in United States Patents numbered 244,721 and 244,725, issued July 19, 1881.

The objects of the improvements herein described and claimed is to make a machine more simple and less expensive in construction and more rapid and efficient in its operation. This is accomplished by securing the type-carriers to a circular base which is adapted to be rotated step by step on a suitable circular track or raceway and combining therewith substantially the same method and mechanism heretofore used in machines of this character, whereby the types are separated from the page and fed one by one to the carriers and thereafter automatically ejected therefrom at the proper instant into suitable conductor-tubes which serve to guide them into their appropriate compartments of a type-case having parallel type-channels.

Various modifications and improvements in the construction and manner of operation of the type selecting and ejecting mechanism have been made, whereby the parts are better adapted to the circular arrangement and movement of the carriers.

The following general description of type-distributing machines of the character shown in the patents above referred to, as heretofore constructed, will be of assistance to a clear understanding of the nature and scope of the improvements which are comprised in the present invention.

The machine is adapted to automatically distribute the types composing a column or page which is placed on a suitable galley into type-cases having a series of parallel type containing channels, a separate channel being provided for each of the several type-characters it is desired to use. The series of operations by which the proper distribution of the types is effected in machines of this class may be classified as follows:

First. Suitable automatic mechanism separates a single line of type from the page or column on the galley and automatically presents it to the action of the machine for distribution.

Second. Suitable "cut-off" mechanism separates from the end of the line a single type, which is thereupon placed into a carrier, where it is retained by a spring-clutch.

Third. A number of these individual carriers are provided, which are essentially blocks of steel suitably machined and provided with spring-clutches for retaining the types in a suitable recess and an ejecting-slide for forcing the type out at the proper time. These carriers are contained in two longitudinal raceways, being packed therein side by side in a continuous solid line. Suitable mechanism is provided whereby the entire line of carriers is caused to move step by step along the raceways, those in the front raceway moving in one direction and carrying the types until they reach their proper channels, while the empty carriers in the rear raceway are simultaneously moved step by step in the opposite direction until they are returned to the initial end of the raceway. As the carriers in the front and rear raceways are thus caused to move simultaneously in opposite directions one of the front row of carriers is by suitable mechanism transferred to the rear raceway and one of the rear row of carriers at the same time transferred to the front raceway in position to receive a type from the end of the line which is being distributed.

Fourth. As the carriers in the front row are thus moved step by step in a straight line along their horizontal raceway each one holds a single type, and during the time when the carriers are at rest a series of nick-pins secured to suitable feeler-blocks are caused to move toward the row of carriers until the projecting ends of the nick-pins engage the edges of the types. The types have shallow nicks cut in their edges, and the number and relative location of the nicks are different for each character in the font of type. The nick-pins in each of the several blocks correspond in number and relative position with the nicks of the several type characters.

Fifth. Whenever a type is brought directly in line with a feeler-block, the nick-pins of which register with and enter the nicks in its edge, the feeler mechanism is caused to act, which allows a lever having a hook or lug thereon to fall and engage the type-ejecting slide of the carrier which contains that type.

Sixth. As the feeler mechanism to which the hooks are secured is withdrawn, the type-ejecting slide is thereby drawn outward, forcing the type out from the carrier directly over an opening in a type-conductor tube through which it drops into its proper channel in the type-case.

Machines of this character, as heretofore constructed, require considerable power for their operation, owing principally to the considerable weight of the carriers which are required to be moved in the manner above described, step by step at a high rate of speed in order to make the operation of the machine commercially profitable. Furthermore, this necessarily rapid reciprocating movement of the carriers causes destructive wear to the mechanism and undesirable vibration and noise. It is furthermore very essential that the thickness of the individual carriers should be made and always remain exactly equal to the distance between the centers of the nick-pins and type-conductor tubes, as otherwise some of the nick-pins may fail to engage the edge of the thin types, nor will the types always be ejected freely into the tubes, thus causing frequent blocks and stoppage of the machine. It has been found in practice that a slight wear of each of the individual carriers or accumulation of dirt on or between them will cause a variation in the aggregate length of the row of carriers sufficient to prevent the exact registering of the carriers with the tubes, as well as with the feeler-pins, both of which in practice are very essential to the continuous and automatic operation required to make such a machine commercially practical. It is evident that the use of a continuous ring of type-carriers with its simple step-by-step rotary movement, which is the essential feature of this invention, will overcome the serious defects above noted which have heretofore been encountered in the practical operation of the machine. Such carriers when once properly spaced and permanently secured to the circular base so as to register with the tubes and feeler-blocks can never vary in alinement, while the simple step-by-step movement of the entire ring in one direction may be more rapidly affected by much simpler mechanism than is required to cause the proper and timely rectangular circulation of the individual carriers heretofore used.

The preferred construction of a type-distributing machine embodying the improvements herein described and claimed is shown in the six sheets of drawings forming a part of this specification, in which—

Figure 1 is an elevation, and Fig. 2 a plan view, of the complete machine. Fig. 3 is a diagrammatical sectional view showing a single set of type-carrier and feeler mechanism. Fig. 4 is a similar sectional view showing the manner of elevating the feeler-slide frame. Fig. 5 is an enlarged plan view of the type-galley and the mechanism for separating and inserting the individual types into the carriers. Fig. 6 is a sectional elevation substantially along the line A A of Fig. 5. Fig. 7 is a sectional view substantially along the line B B of Fig. 6. Fig. 8 is an enlarged side view of the type-galley and the mechanism for actuating the type-driver and line-closing mechanism. Fig. 9 is a perspective view, on an enlarged scale, showing one of the type-carriers and a section of the ring to which it is secured. Fig. 10 is a plan view, sectional, along the line C C of Fig. 8, showing the operation of cutting off the type from the end of the line by the type-driver slide and the line-closing finger. Fig. 11 is a diagrammatical sectional view of a portion of Fig. 3, showing the operation of the feeler mechanism when the nick-pins engage corresponding nicks in the edge of a type.

Similar reference-figures refer to similar parts throughout the several views.

1 is the base of the machine, which is supported by the legs 2.

3 is a circular bed-plate supported and secured to the base 1 by the upright posts 4. This bed-plate is preferably made of a single casting of substantially the form shown. It comprises, essentially, a rim part, in which is formed the track or raceway 5 for the ring of type-carriers 7, and a central part containing the bearings of the vertical shaft. The rim and central part are connected by radial arms 3'. The machine shown is really a double machine and has two type-galleys 8, and the operative mechanism generally is in duplicate. 9 represents the main operative shafts, secured in bearings 9' in the base of the machine. These shafts are geared to a cross driving-shaft 10, having a pulley 11 to which power may be communicated by a belt or other suitable means. The rotation of the driving-shaft in the direction of the arrow causes the main shafts 9 to rotate in opposite directions, as shown by the arrows.

For the purpose of more clearly describing the construction and operation of the entire machine the various component elements will first be described and followed by a description of the operation of the machine as a whole.

1. *The type-galley and type-feeding mechanism.*—8 is the type-galley, adapted to hold a page or column of type 6, and is best shown in Figs. 2, 5, and 7.

12 is the page-follower, sliding upon the horizontal rod 13, attached to the arm 14, as shown in Fig. 2. For the purpose of keeping the page-follower 12 constantly pressed against the body of type to be distributed a cord 15 is attached to it by the button 16. This cord 15 passes over a loose pulley carried on a suitable bracket 17, and at its lower end a weight 18 is attached. In this manner the page-follower 12 is drawn forward against the page of type, which is thereby constantly advanced as the type is removed from the page by the line-elevator line by line.

The line-elevating mechanism is best shown in Figs. 6 and 7. 21 is a vertical plate extending along and under the foremost line of type 19 in the galley when in its lowered position. (Shown in Fig. 7.) This elevating-plate 21 is attached to the standard 22, which is adapted to slide vertically in bearings in the lugs 23. A horizontal arm 24 is secured to the vertical standard 22. A lever 25 is pivoted to the arm 24 at the point 26 and carries at its outer end a roller 27, which engages the groove in the cam 65, the shape of which is shown in Fig. 6 by the broken lines. The pivoted lever 25 is normally held in the position shown in Fig. 6 by means of the spring 29. The upper end of the spring is secured to the post 28, which has its base secured to the pivoted lever, and the lower end of the spring is secured to the outer end of the lever 25. In the event of any obstruction preventing the free elevation of the plate 21 the spring 29 will allow the lever 25 to be raised from its normal position parallel with the arm 24. The tension of the spring 29 should be sufficient to hold the lever 25 down under all normal conditions, its function being solely to relieve any unusual strain likely to cause distortion or breakage of the parts.

When a line of type is advanced by the page-follower 12 and pushed over the edge of the galley 8, the plate 21 will be in the position in front of the edge of the galley and on a level with the edge, and the line of type so advanced will rest upon the plate 21. When this has been accomplished, the revolution of the cam 65 will begin and the cam-slot therein will engage with the roller 27 on the pivoted lever 25 on the horizontal arm 24, elevating the standard 22 and plate 21, and thus raise the line to the position shown in Figs. 6 and 7 and hold it in this elevated position until the type-driver has picked off the type letter by letter.

30 is the line-follower, which, as shown in Figs. 2 and 6, slides horizontally forward and backward on the frame 31. It is provided at one side with a button 32, to which is attached a cord 33, which passes over a loose pulley 34 upon the frame 31 and to the lower end of which a weight 35 is attached. In this manner the line-follower 30 is kept constantly pressed against the line of type 19, thus advancing it forward as the letters are picked off by the type-driver one by one.

The mechanism whereby the types are separated or cut off from the end of the line one by one, regardless of their variable thickness, and then placed in the carriers is clearly shown in Figs. 5, 8, and 10. 36 is the type-driver slide proper, which is fitted to move longitudinally in bearings 37, secured to the side of the galley 8. 38 is a bent lever pivoted at 39 to the upright post 40, which supports the entire type-galley and its operative parts. This bent lever is preferably made, as is clearly shown, of two independent parts, pivoted at the common point 39. The outer part has a short arm 38', which has a slot 41 in its enlarged end, and a bolt 42 serves to securely clamp the parts. The object of this construction is to readily adjust the lever to the proper angle. A roller 43 on the inner end of the lever 38 engages the cam 44, the proper shape of which is substantially as shown in Fig. 8. The outer end of the lever 38 has a stud 45, which enters a slot 46 in the plate 47, which is secured to the slide 36. The slot 46 is wider than the stud 45.

48 and 48' are two cylinders which contain spiral springs, which force the pins 49 and 50 against the end of the type-driver slide 36 and the stud on the lever 38, respectively. The spring in the cylinder 48 is the stronger and serves to keep the roller 43 at all times in contact with the surface of the cam 44. When the cam 44 is in such position that the roller 43 rests on its highest part, the lever 38 will be in such position, as shown by the broken lines, to hold the type-driver slide 36 its end to clear the line of type 19. As the cam 44 rotates toward the position shown in Fig. 6 the roller 43 passes on to the slightly-depressed part of the cam, allowing the lever 38 to be advanced by the spring in the cylinder 48 to the position shown, in which the stud 45 has been moved to the right wall of the slot 46. The light spring in the cylinder 47 thereupon forces the type-driver slide up against the corner of the first type in the end of the line 19.

51 is the line-closing finger, which is pivoted at 52 to the type-driver slide 36. The lugs 53 on the end of the finger engage the side of the first type in the line, as shown, and the line-closing finger is held in this closed position against the pressure of the line-follower 30 on the line of type by the lever 54, the outer extremity of which carries a roller 55, which engages with the side of the line-closing finger 51. The lever 54 is secured to a sleeve 56, which is pivoted on a stud 57, secured to the frame 3 of the machine. The lower end of the sleeve 56 carries an adjustable arm 58, attached to the sleeve by a bolt. This arm carries at its other end an adjustable block 59, to which is attached a beveled roller 60, which is so set as to travel along the surface of a cam 61 on the driving-shaft 9. The surface of this cam is uneven and throughout a certain distance slightly raised, so that when the roller 60 comes in contact with the raised portion of the surface a lateral motion will be imparted to the lever 54 and the line-closing finger 51 will be held in its closed position, and will remain in such position as long as the roller is traveling over the raised portion of the cam-surface. As the roller 60 passes off from the raised portion of the cam-surface the finger 51 will be allowed to swing outward gradually to the position shown in Fig. 10. As soon as the line-closing finger 51 has thus opened a sufficient distance for the type-body to clear the end of the plate 20 the type-driver slide will be instantly forced a short distance forward, a distance limited by the width of the slot 46, to the position shown in Fig. 10, thus cutting off the type from the end of the line. As the cam 44 continues to rotate from the position shown in Fig. 8 the roller 43 will engage the depressed surface at 63, which will allow the large spring in the cylinder 48 to move the lever to its extreme inward position, thereby causing the type-driver slide 36 to force the type into the recess in the carrier 7.
For the purpose of causing the proper and timely automatic operation of the line-elevating and line-following slides the cams 64 and 65 are provided, which are secured to shafts 66, which extend through the hollow shafts 67, which rotate in bearings 68 in the frame 1 of the machine. The cam 65 raises and lowers the line-elevating plate 21, as heretofore described. The cam 64 serves to throw back the line-follower slide 30 by engaging the roller 69 on the arm 70 of the lever 71, pivoted at 72 to the bracket 73. The shafts 66 are normally stationary; while the hollow shaft 67 is caused to rotate continuously by means of the spur-gears 74, secured thereto, which engage with worm-gears 75 on the main shafts 9. The ratchet-wheel 76 is secured to the other end of the hollow shaft 67, Figs. 5 and 6, while the disk 77 is secured to the shaft 66. The spring-catch 78 is pivoted to the disk 77 at the point 79. The tooth 80 is adapted to engage a tooth of the ratchet-wheel 76, except when held in the position shown in Fig. 6, by the lower end of the lever 81 engaging the free end of the spring-catch 78. When the entire line of type 19 has been fed into the carriers, the stud 82 on the slide 30 will strike the upper end of the lever 81 and move it toward the left a distance sufficient to throw the lower end toward the right off the end of spring-catch 78, whereupon the tooth 80 on said spring-catch engages a tooth of the ratchet-wheel 76, thereby locking the shaft 66, carrying the cams 64 and 65, to the hollow shaft 67 during one entire revolution of the latter.
Upon the completion of such revolution, during which the cams 64 and 65 have actuated the line-following and line-elevating slides as described, the end of the spring-catch 78 will again engage the lower end of the lever 81 and release the tooth 80, and the shaft 66 will remain stationary until the last type of the newly-elevated line of type has been fed into the carriers.

2. *The type-carriers and actuating mechan-*
*ism.*—The type-carriers used in the present machine are essentially different from any used heretofore in machines of this character. The office of the carriers is to receive and hold the types singly at the point where they are cut off from the line and carry them thence step by step to the points where they are automatically ejected and dropped down through type-tubes into their proper channels in the type-case.
Instead of a series of individual carriers heretofore used the carriers on the present machine are permanently secured to a circular base fitted to rotate freely in a suitable track or raceway in the rim, preferably being supported by ball or roller bearings. The preferred construction of the carriers is clearly shown in the enlarged perspective view Fig. 9, which shows a single carrier secured to the circular base 62. It consists, essentially, of the L-shaped piece 7, the base of which is securely riveted or otherwise attached to the upper surface of the base 62. The type-ejector 83 is secured to the sliding plate 84, and its upper end projects above the carrier, as shown, in order that it may be engaged by the feeler-hook during the operation of the ejection of the type from the carrier in the manner to be hereinafter described. The sliding plate 84 is secured to the vertical arm of the carrier-plate 7 by means of screws 82, which pass through the slotted openings 85 in said plate. The type-clutch 86, which retains the type securely in the carrier until it reaches its proper channel, is pivoted to the rear rail of the carrier-ring base 62 and is normally kept in a closed position by means of the spring 87, which engages the wall of the adjoining carrier.

The mechanism whereby the ring of carriers is caused to rotate step by step is shown more clearly in Figs. 3 and 6. Ratchet-teeth 88 are provided on the lower edge of the rear rail of the carrier-ring 62, and the number of such teeth and distance between centers corresponds with that of the carriers. A pawl 89 is pivoted to the arm 90, which is secured to a rock-shaft 91, supported in bearings 92. A horizontal arm 93, which is also secured to the rock-shaft 91, has a roller 93' on its outer end which engages a cam 94, secured to the shaft 9. The pawl 89 is kept in engagement with the ratchet-teeth 88 by means of a light spring 95. A coiled spring 96 keeps the roller 93 in contact at all times with the face of the cam 94. The cam 94 is provided with a portion having a greater diameter than the remainder and which extends over an arc of substantially that shown in Fig. 3. It will be evident from the construction that each revolution of the shaft 9 and attached cam 94 will cause such a movement of the pawl as will advance the carrier-ring 62 a distance equal to the width of each one of the carriers.

It is essential to the successful operation of type-distributing machines of this character that the ring of carriers be securely held with the carriers accurately in line with the type-feeding mechanism and also with the several type-channels during the intervals between the successive step-by-step advances. This essential condition is attained, preferably, by means of a sliding bar 100, having its forward end adapted to enter successively the openings 97 in the rear flange of the carrier-ring base 62. The sliding bar 100 is secured in bearings 101, so as to move freely longitudinally, and is actuated by means of the lever 102. This lever is pivoted at 103 to a bracket secured to the arm 3', and its upper end engages a pin 104 on the sliding bar 100. A roller 105 engages a cam 106, secured to the shaft 9. The tension of the spring 107 causes the roller 105 to follow the curve of the cam 106, which is so shaped that immediately after the ring of carriers has been advanced, as heretofore described, the sliding bar 100 will be caused to move forward and enter one of the openings 97 and remain therein, thereby locking and preventing any movement of the ring of carriers during the greater part of the revolution of the cam 106 and until the type-feeding and type-ejecting devices have accomplished their cycle of operations, as will be hereinafter described.

In order that the type-clutch 86 may be opened at the proper time to allow a type to be fed into the carrier and then allowed to close to retain the type by the action of the spring 87, a beveled shoulder 108 on the sliding plate 100 is adapted during its outward movement to engage the inwardly-projecting beveled end of the type-clutch 86.

The object of the step-by-step rotation of the ring of carriers, as above described, is to bring the types while held in the carriers successively into position where they will be selected and ejected into their proper tubes by means of the mechanism to be next described.

3. *The type-selecting and type-ejecting mechanism.*—Only a single set of this mechanism, as is shown in the diagrammatical sectional views Figs. 3 and 4, will be described; but, as will be apparent from the drawings, as many duplicate sets are provided as there are separate letters or characters in the font of type used and of the type-channels in the type-cases, and their operation will be simultaneous with and similar to that of the one set shown. The feeler-block 110 is secured to the outer end of the feeler-slide 111, which may be moved freely longitudinally in bearings 112. The outer bearing is formed in the upper edge of the curved front plate 113, which is secured to the outer rim of the frame 114 by screws 115, while the inner bearing is in the plate 116, which is secured to the frame 114. The frame 114 is fitted to slide vertically on the posts 160 for the purpose of allowing the entire frame, together with the curved front plates 113 and the feeler mechanism of the entire machine, to be raised bodily, as shown in Fig. 4, to allow free access to the carriers 7 and the type-conducting tubes 98. The nick-pins 117 are rigidly secured to the feeler-block 110. The number and relative location of these feeler-pins is different for each feeler-block of an entire series and corresponds with the number and location of shallow nicks 99, (see Fig. 9,) which are cut in the edge of the several letters or characters in the font of type.

118 is the tripping-pin, which passes through a bearing in the feeler-block 110 and has a small stop 119 secured thereto.

120 is the tripping-hook, which is pivoted in a recess in the feeler-block 110 at the point 121. This tripping-hook is actuated by the stop 119, secured to the tripping-pin 118, being normally held forward in the position in Fig. 3 by the spring 109. The tripping-pin and the nick-pins pass through suitable openings in the front plate 113 and engage with the edge of the type held in the carrier 7. 122 is the feeler-hook lever, which is pivoted at the point 123 to the feeler-slide 111. An arm 124 extends upward from the pivoted feeler-lever 122, and when the slide is in its extreme outward or normal position, as shown in Fig. 3, this arm, engaging the fixed stop 125, will keep the feeler-lever in such position that the lugs 126 and 127 will slightly clear the tripping-hook 120 and the top of the type-ejector 83, respectively. If now the feeler-slide 111 be moved inward, the end of the arm 124 will at once be released from engagement with the fixed stop 125, allowing the feeler-lever to drop until the lug 126 rests upon the inner edge of the tripping-hook 120; but the lug 127 will still be supported above the top of the type-ejector 83 until such time as the tripping-hook may be forced backward or tripped. This occurs only when the nick-pins 117 engage with and enter corresponding nicks cut in the edge of the type, as shown in Fig. 11. The ends of the nick-pins 117 and the tripping-pin 118 are exactly in line normally, and thus whenever the nick-pins 117 enter the nicks 99 in the edge of a type the tripping-pin 118 will engage the full edge of the type and be forced outward, causing the stop 119 to engage the tripping-hook 120 and force it to the left against the tension of the spring 109 until its edge clears the lug 126, which thereupon allows the feeler-lever to drop, as shown in Fig. 11, with the lug 127 below the top of the type-ejector 86 in the carrier 7. The reverse or outward movement of the feeler-slide 111 will then cause the lug 127 to engage and force outward the type-ejector 83, forcing the type out of the carrier into a channel 128 in the front plate 113, where it is free to drop by gravity down the type-conducting tube 98 into its proper place in the type-case. When the feeler-slide 111 is moved out to its extreme forward position, the arm 124 will again engage the fixed stop 125, raising the feeler-hook lever 122 until the lug 126 clears the edge of the tripping-hook 120, which is then at once returned to its normal position by the spring 109. The timely and simultaneous longitudinal movement of the radially-arranged feeler-slides is preferably attained by the mechanism shown more clearly in Figs. 2, 3, and 4. The feeler-slides 111 are arranged in groups, as shown; each group containing as many of the slides as there are channels in the corresponding type-case 130. The inner ends of the feeler-slides 111 are notched at 131. For the purpose of moving the entire group of slides simultaneously the levers 132 are provided, which are pivoted to the frame 114 at 133. The lower curved plate 134, which connects the vertical arms of the levers 132, engages the slots 131 in the feeler-slides 111. The plate 134 is less in thickness than the width of the slots 131, and springs 135, secured to the end of each feeler-slide, serve to keep the outer edge of the slot 131 normally in contact with the outer face of the curved plate, as shown in Figs. 3 and 4. The necessity for this spring connection is that the distance of the inward movement of the feeler-slides will vary, such variation depending upon whether or not the nick-pins register or fail to register with nicks in the type. In other words, the normal inward movement of the feeler-slides must be sufficient to carry the nick-pins to at least the full depth of the nicks in the edge of the type. The spring connection with the curved plate 134 and the feeler-slides 111 is therefore essential whenever the nick-pins fail to register with the nicks, thereby engaging the full edge of the type in the carrier, which prevents such slide from making its full inward movement. The inner ends of the horizontal arms of the levers 132 are joined together and are normally held between the circular plates 136 and 137, the plate 136 being secured to the upper end of the vertical shaft 138. Suitable openings 139 in the upper plate 137 are provided, which are so located that if the screws 140 be loosened and the plate 137 rotated by means of the handle 141 the full distance allowed by the curved slots 142 the openings will then be directly over the inner ends 129 of the levers 132, thus allowing the levers to be raised freely with the frame 114, as shown in Fig. 4. The vertical movement of the shaft 138 and plates 136 and 137 which is required to actuate the levers 132, and thereby cause the necessary horizontal movement of the feeler-slides 111, is secured by means of the lever 143. This lever has its outer end pivoted to the upright post 4 at 144 and its inner end pivoted to the sleeve 145 on the vertical shaft 138. A roller 146, secured to the lever 143 travels in the slot 146 in the cam 106. This cam-slot is so shaped and so adjusted relative to the other cams that the up-and-down movement communicated to the vertical shaft 138, which causes the proper and simultaneous inward and subsequent outward movement of feeler-slides, will be effected while the carrier-ring is at rest and locked securely by the slide 100, as heretofore described.

*4. The type-conductor tubes and the cases.*—The type-conductor tubes are rectangular rods 147, equal in number to the channels of the type-cases and having a groove 98 cut, which is somewhat larger than the particular type which is to pass down therein. These grooves in the conductor-tubes are twisted ninety degrees, so that the types, which enter them at the top with their nicks facing the front of the machine, are turned one-quarter around and when they reach the bottom of the conductor-tubes have their nicks facing to the side and are thus dropped into the channels of the case with their nicks all facing one side of the same.

The conductor-tubes of each group are equal in number to the type-channels in each case 130 and are secured to the rabbeted bars 148 and by mortised grooves. Their upper ends are arranged in an arc of a circle, so that the upper openings of the grooves will be directly in line with the lower ends of the grooves in the curved front plates.

Heretofore in type-distributing machines having devices arranged to deliver types at different points of a circular path individual type-receiving channels have been used, which were arranged radially in the distributing-machine to receive the types. In transferring the type from such radial channels to a composing-machine it was necessary to transfer the type-channels singly to the composing-machine or to remove the types themselves bodily from the distributing-channels to the channels of the cases used in the composing-machine.

Since the type-channels used in composing-machines are generally arranged parallel, it is much more convenient and economical in making the transfers between the distributing and composing machines to have a considerable number of such channels secured together to form a case, as shown in Figs. 1 and 2, so they may be handled as a unit.

In order that the types may be guided into the ends of the several channels composing the case, the lower ends of the conductor-tubes of each group are arranged in a straight line tangent at its central point to the arc of the circle.

The cases are shown in Figs. 1, 2, and 3 and consist of a number of partitions 149, dividing the case into a series of grooves or channels 150, each wide enough for a type, into which the types are dropped through the conductor-tubes 147. The cases are readily removable from the machine, when they are supported on brackets 151 in an inclined position which is highest at its receiving end, thus inclining the types forward upon each other, in which position they are retained by gravity, as is apparent.

In each channel is a spring-slug 152, against which the line of type rests and which readily slides as additional types are dropped in and advanced, as will now be described. The forcing of the types forward as they drop into the channels, thus keeping a space cleared at all times for the types to drop freely into the channel, is effected by the radially-arranged sliding bars 153, having secured to their outer end a cross-bar 154, as shown clearly in Fig. 3. The sliding bars 153 are adapted to reciprocate freely longitudinally in bearings 155. Pins 156 are secured to the cross-bars 154, one of which enters each compartment 150 of the type-cases, where they engage the types and force them forward when the sliding bars are caused to reciprocate. This movement is effected by a cone-shaped cam 157, secured to the vertically-reciprocating shaft 138. This cone-shaped cam engages the rollers 158 on the inner ends of sliding bars 153. The spring 159 keeps the roller 158 at all times in contact with the surface of the cone-shaped cam 157.

*Method of operation.*—A page of type to be distributed is placed upon one or both of the type-galleys 8 with the page-followers properly set. The power is applied by belt or other suitable means to the driving-shaft 10. Thereupon the shafts 9 begin to rotate, and the ring of carriers is caused to rotate step by step. The foremost line of type of the page on each galley is raised by the line-elevating slide 21 and immediately advanced to the point where each type beginning with the first is successively cut off and forced into a carrier. One character or type at a time is cut off from the end of the line by type-driver slide moving at right angles to the line, which always takes a single type only, whatever its thickness, and inserts it into a type-carrier 7. When the last character of a line has passed into the machine, the line-elevating plate automatically sinks below the level of the bottom of the types of the page, which is then advanced to bring the succeeding line over it, and the plate again rises with a new line, and so on until the last line of the page enters the machine. The step-by-step movement of the carrier-ring as the types are fed thereto serves to bring the types successively into line with each feeler-block, in which position they rest for a short time. At this time the feeler mechanism begins to operate, and each character in each carrier is subjected to the action of the duplicate sets of feeling mechanism. In each case where the nick-pins of the feeling mechanism enter the appropriate nicks in a character of type held in a carrier the tripping-pin will operate to trip the tripping-hook. This in turn will permit the corresponding feeler-lever to fall and the lug thereon to engage with the ejector of that particular carrier, whereupon the feeler-slide and its lever will be moved backward by the action of the mechanism, as heretofore described. The resulting movement of the ejector will cause the particular type to be ejected from the carrier and to fall down the passages 98 into the type-channels 150, down which they will be fed by the reciprocating bunters.

It will be evident that each of the nick-pins must during the entire travel of the carrier-ring select one type from each line of carriers, and as there are as many carriers and different sets of selecting mechanism as there are different characters in the font to be distributed all the characters will have been selected, and the carriers will all have been emptied by the time the carrier-ring has made one-half of its complete revolution, as no one character can pass all of the selecting-pins. As soon as any character is selected and ejected the projection on the feeler-lever arm as it slides backward is engaged by the projection 125 on the frame of the machine. This lifts each feeler-lever for an instant a sufficient distance to raise the lugs on the levers to carry them clear of the type-ejectors 83, and the tripping-hooks 120 will then be forced forward under the lugs on the end of the feeler-levers, where they will be held until such time as the selecting-pins select a new character and they fall and engage the ejector, as before.

During the operation of the machine the various upper portions of it—such as, for example, the page-follower, the line-lifter, the line-follower, and the carrier-actuating mechanism—will continue to be operated automatically, as described, as long as any of the type remains on the type-galley.

It is evident that a greater number of the galleys and sets of type-cases may be provided for by simply increasing the diameter of the ring of carriers and making suitable mechanical changes in the arrangements of the driving-shafts and other mechanism. Also the diameter could be reduced and only a single type-galley and set of cases be used.

Having thus described my invention, what I claim, and desire to secure by Letters Patent, is—

1. In a type-distributing machine the combination with a circular set of type-carriers having a step-by-step rotary movement in a circular track or raceway; of means for automatically feeding types from a page one by one into said carriers, and appropriate radially-arranged type-selecting and type-ejecting mechanism having a simultaneous radial reciprocating movement whereby the types in the carriers at each pause of the step-by-step rotary movement are subjected to the action of such selecting and ejecting mechanism.

2. In a type-distributing machine the combination with a circular set of type-carriers, of mechanism for imparting thereto a step-by-step rotary movement, and appropriate radially-arranged type-selecting and type-ejecting mechanism having a simultaneous radial reciprocating movement whereby the types in each carrier at each pause of the step-by-step rotary movement are subjected to the action of such selecting and ejecting mechanism.

3. In a type-distributing machine the combination with a circular set of type-carriers, of mechanism for imparting thereto a step-by-step rotary movement, means for securely locking such ring to prevent accidental movement between each successive step, and appropriate type-selecting and type-ejecting mechanism having a simultaneous radial reciprocating movement whereby the types in each carrier are subjected to the action of such selecting and ejecting mechanism during the time when the set of type-carriers are locked.

4. In a type-distributing machine the combination with a circular set of type-carriers, and having as a whole a step-by-step rotary movement, of radially-arranged feeler-slides to which are secured feeler-blocks carrying suitable nick-pins, tripping-pins, tripping-hooks and feeler-hooks, and suitable mechanism whereby the feeler-slides are simultaneously caused to move radially to and from the edge of the types contained in the carriers at each pause of the step-by-step rotary movement of the carriers.

5. In a type-distributing machine the combination with a circular set of type-carriers adapted to hold and convey types, of suitable devices actuated simultaneously for selecting and ejecting such types from the carriers at the proper instant, and type-conducting tubes having their upper ends on a circular arc and their lower ends in a straight line for guiding the types into the proper compartments of a type-case having parallel type-channels.

6. In a type-distributing machine the combination with a circular set of type-carriers having a step-by-step rotary movement in a circular track or raceway, of means for automatically feeding types from a page one by one into said carriers, appropriate radially-arranged type-selecting and type-ejecting mechanism whereby the types in the carriers at each pause of the step-by-step rotary movement are subjected to the action of such selecting and ejecting mechanism, and type-conducting tubes having their upper ends on a circular arc and their lower ends in a straight line for guiding the types into the proper compartments of a type-case having parallel type-channels.

7. In a type-distributing machine, a series of distributing devices arranged to deliver type at different points in a common circular path, in combination with type-conductor tubes leading from the respective delivery-points to points in a common straight line, whereby the circulating distributing-mechanism is adapted to deliver type to a flat case or galley.

8. In a type-distributing machine the combination with a circular set of type-carriers, and having as a whole a step-by-step rotary movement, of radially-arranged feeler-slides to which are secured feeler-blocks carrying suitabl enick-pins, tripping-pins, tripping-hooks and feeler-hooks, notches near the inner ends of the feeler-slides, a curved plate engaging the notches of a group of feeler-slides, and means for causing the curved plates to be reciprocated laterally and thereby cause the feeler-slides to move simultaneously and radially to and from the edge of the types contained in the carriers.

9. In a type-distributing machine the combination with a circular set of type-carriers, and having as a whole a step-by-step rotary movement, of radially-arranged feeler-slides to which are secured feeler-blocks carrying suitable nick-pins, tripping-pins, tripping-hooks and feeler-hooks, notches near the inner ends of the feeler-slides, a curved plate engaging the notches of a group of feeler-slides and secured to one end of a bell-crank lever, a vertical shaft adapted to engage the free ends of said bell-crank levers, and suitable mechanism substantially as specified for causing the vertical shaft to be reciprocated longitudinally whereby the feeler-slides are simultaneously moved radially to and from the edge of the types contained in the carriers at each pause of the set of carriers between the successive movements.

10. In a type-distributing machine the combination with a circular set of type-carriers, of mechanism for imparting thereto a step-by-step rotary movement, appropriate radially-arranged type-selecting and type-ejecting mechanism whereby the types in each carrier at each pause of the step-by-step rotary movement are subjected to the action of such selecting and ejecting mechanism, and a frame for supporting the feeler mechanism which may be readily raised and lowered or removed from the machine to allow free access to the carriers and driving mechanism underneath.

11. In combination, a flat type galley or magazine provided with parallel type-receiving channels, a rotary distributing mechanism arranged to deliver type at different points in a circle, and means for conducting said type from said points to the respective channels of the galley.

12. A circular rotary type-distributing mechanism, a flat receiving-galley provided with parallel channels and means for delivering the type from different points in the distributing mechanism to the respective points in the galley.

Signed at New York, in the county of New York and State of New York, this 6th day of October, A. D. 1902.

FRANK McCLINTOCK.

Witnesses:
JOHN WATSON,
LUDLOW E. QUICK.